United States Patent
Ucgun (10) Patent No.: US 10,393,163 B2
(45) Date of Patent: Aug. 27, 2019

(54) MECHANISM FOR HEIGHT AND DISTANCE ADJUSTMENT IN PILATES EXERCISE EQUIPMENT

(71) Applicant: BASI SYSTEMS PILATES SANAYI TICARET A.S., Istanbul (TR)

(72) Inventor: Mumin Cengiz Han Ucgun, Istanbul (TR)

(73) Assignee: BASI SYSTEMS PILATES SANAYI TICARET A.S., Istanbul (TR)

( * ) Notice: Subject to any disclaimer, the term of this patent is extended or adjusted under 35 U.S.C. 154(b) by 61 days.

(21) Appl. No.: 15/551,038

(22) PCT Filed: Mar. 22, 2016

(86) PCT No.: PCT/TR2016/000037
§ 371 (c)(1),
(2) Date: Aug. 15, 2017

(87) PCT Pub. No.: WO2016/153446
PCT Pub. Date: Sep. 29, 2016

(65) Prior Publication Data
US 2018/0023605 A1    Jan. 25, 2018

(30) Foreign Application Priority Data

Mar. 24, 2015   (TR) .............................. a 2015 03521

(51) Int. Cl.
*F16B 7/14*    (2006.01)
*A63B 3/00*    (2006.01)
*A63B 21/00*   (2006.01)

(52) U.S. Cl.
CPC .............. *F16B 7/1472* (2013.01); *A63B 3/00* (2013.01); *A63B 21/4034* (2015.10);
(Continued)

(58) Field of Classification Search
CPC .. A63B 1/00; A63B 1/005; A63B 3/00; A63B 9/00; A63B 17/00; A63B 17/02;
(Continued)

(56) References Cited

U.S. PATENT DOCUMENTS 3,020,909 A * 2/1962 Stevens .............. A61G 13/0036
                                                    5/623
3,339,913 A * 9/1967 Anderson .............. A61G 13/12
                                                    248/298.1
(Continued)

FOREIGN PATENT DOCUMENTS

CN         202833484 U      3/2013
EP         0940589 A2       9/1999

*Primary Examiner* — Gary D Urbiel Goldner
(74) *Attorney, Agent, or Firm* — Gokalp Bayramoglu (57) ABSTRACT

The adjustment mechanism according to the present invention is composed of a body, a hollow bar interior formed in the body, at least one screw hole formed on one side of the body, at least one tightening screw passing through the screw hole, a knob rigidly connected to the tightening screw to turn the screw, at least one tightening member on which the tip portion of the tightening screw rests in the interior, at least one guide rigidly connected to the tightening member, and at least one guide hole formed on the body supporting the guide in a free fit.

3 Claims, 7 Drawing Sheets

(52) U.S. Cl.
CPC ...... *A63B 21/4035* (2015.10); *A63B 2225/09* (2013.01); *A63B 2225/093* (2013.01)

(58) Field of Classification Search
CPC .............. A63B 17/04; A63B 21/00058; A63B 21/00069; A63B 21/012; A63B 21/08; A63B 21/16; A63B 21/4027; A63B 21/4033; A63B 21/4034; A63B 21/4035; A63B 21/4039; A63B 21/4041; A63B 21/4045; A63B 21/4047; A63B 21/4049; A63B 22/0046; A63B 22/0087; A63B 22/0089; A63B 71/0054; A63B 2071/0063; A63B 2071/0072; A63B 2071/0081; A63B 2071/009; A63B 2210/00; A63B 2210/50; A63B 2225/09; A63B 2225/093; F16B 7/10; F16B 7/1472; Y10T 403/3926; Y10T 403/3933; Y10T 403/4608; Y10T 403/4611; Y10T 403/4614; Y10T 403/4617; Y10T 403/7075; Y10T 403/7077; Y10T 403/7079; Y10T 403/7084; Y10T 403/7088
USPC ..... 403/191, 192, 233–236, 376–378, 379.3, 403/379.5
See application file for complete search history.

(56) References Cited

U.S. PATENT DOCUMENTS

| | | | |
|---|---|---|---|
| 3,537,762 A | 11/1970 | Lodige | |
| 3,989,241 A * | 11/1976 | Ourgant | A63B 21/04 482/129 |
| 4,113,221 A | 9/1978 | Wehner | |
| 4,254,763 A * | 3/1981 | McCready | A61B 17/0293 600/228 |
| 4,725,030 A * | 2/1988 | Miller | A61G 12/00 24/606 |
| 4,838,409 A * | 6/1989 | Rappen | B65G 45/12 198/497 |
| 5,385,323 A * | 1/1995 | Garelick | A47C 3/28 248/157 |
| 5,513,825 A * | 5/1996 | Gutgsell | A47B 9/08 108/147 |
| 5,556,067 A * | 9/1996 | Konig | B01L 9/00 248/220.21 |
| 5,570,957 A | 11/1996 | Kuly et al. | |
| 5,662,591 A * | 9/1997 | Peindl | A61B 5/224 5/648 |
| 6,119,317 A * | 9/2000 | Pfister | F16M 11/24 24/514 |
| 6,554,235 B1 * | 4/2003 | Fortier | A47B 57/565 248/122.1 |
| 7,364,533 B2 * | 4/2008 | Baker | A63B 22/0605 248/408 |
| 7,422,224 B2 * | 9/2008 | Sicz | B62J 1/06 248/408 |
| 9,573,011 B1 * | 2/2017 | Nasta | A63B 21/00 |
| 2008/0116333 A1 * | 5/2008 | Chang | F16M 11/28 248/200.1 |
| 2010/0056348 A1 * | 3/2010 | James | A63B 21/00069 482/127 |
| 2014/0213414 A1 * | 7/2014 | Balandis | A63B 24/0087 482/5 |
| 2017/0136287 A1 * | 5/2017 | Ucgun | A63B 21/159 |

* cited by examiner

FIGURE 7

MECHANISM FOR HEIGHT AND DISTANCE ADJUSTMENT IN PILATES EXERCISE EQUIPMENT

CROSS-REFERENCE TO RELATED APPLICATIONS

This application is the national phase entry of International Application No. PCT/TR2016/000037, filed on Mar. 22, 2016, which is based upon and claims priority to Turkish Patent Application No. 2015/03521, filed on Mar. 24, 2015, the entire contents of which are incorporated herein by reference.

TECHNICAL FIELD OF THE INVENTION

The present invention relates to an adjustment device for Pilates exercise equipment. The present invention particularly relates to an adjustment mechanism which provides a simple, safe and fast adjustment capability in Pilates exercise equipment requiring distance, height, and width adjustments.

BACKGROUND OF THE INVENTION

Pilates exercise devices are such devices which are used both for sports-oriented exercises and physiotherapy exercises. These devices may be of great variety according to the type of exercises to be performed. Some of these devices operate while one performing the Pilates work is sitting, whereas some others operate while one assumes a lying position, a standing position, or any other balance conditions. The ones who perform Pilates works have to make some adjustments on the device during work according to their bodies or to the type and load of the exercise. For instance, in an exercise in which the performer sits or lays down, the arms of the Pilates device which allow to exercise the hands or feet are coupled to a tubular framework. In order to change the distance or height of these arms from the body of the exercising person, a screw-fixed adjustment mechanism provided on the tubular framework must be loosened, the mechanism must be adjusted to an ideal distance, and then the mechanism must be tightened back.

The adjustment mechanisms according to the prior art cannot provide an ideal user comfort, since the mode of operation of the adjustment devices typically coupled to tube- or rod-shaped profiles is based on tightening the respective screws or relocating the respective pins. Sometimes, the adjustment of Pilates devices turns out to be very difficult for women particularly. On the other hand, the damages caused by screw-tightening due to adjustments made again and again, both make the profiles, i.e. the support bars, useless in time, and spoils their appearance. Particularly, the surface of such support bars becomes deformed both in terms of appearance and smoothness, due to the compression of the screw heads exerted thereon.

When an ideal adjustment is made in terms of distance and height in an adjustment device according to the prior art, the device has to be tightened using great arm strength to provide rigidity. This can both damage the hand of the user and reduce user comfort.

SUMMARY OF THE INVENTION

It is aimed with the adjustment mechanism according to the present invention to provide a simple, practical and safe height- and spacing-adjustment to be made without damaging the support bars of Pilates exercise devices particularly. For this reason, novelties are made both on the support bars to which the adjustment mechanism is coupled, and on the adjustment mechanism itself.

With the adjustment mechanism according to the present invention, a groove is formed on the respective support bar on which adjustment is to be made. The adjustment mechanism is displaced along this groove on the support bar. The tightening part of the adjustment mechanism is moved in the groove and tightened or loosened in an easy manner. Thus, a safe and accurate adjustment is made without damaging the respective support bar.

The adjustment is made in an easy manner without damaging the support bar by means of a compression plate formed on the head of an adjustment screw by which adjustment is made in the adjustment mechanism according to the present invention. Thus, difficulties faced by users during adjustment as encountered in the prior art and the damages occurring on support bars are both eliminated.

In order to provide a better understanding of the device according to the present invention, it shall be referred to the figures.

REFERENCE NUMBERS OF PARTS AND SECTIONS IN FIGURES ILLUSTRATING THE PRESENT INVENTION

1—Adjustment mechanism
2—Support bar
3—Body
4—Joining post
5—Knob
6—Groove
7—Tightening screw
8—Tightening element
9—Guide
10—Guide hole
11—Screw hole
12—Coupling
13—Hollow body interior

DETAILED DESCRIPTION OF THE INVENTION

Figure 1:
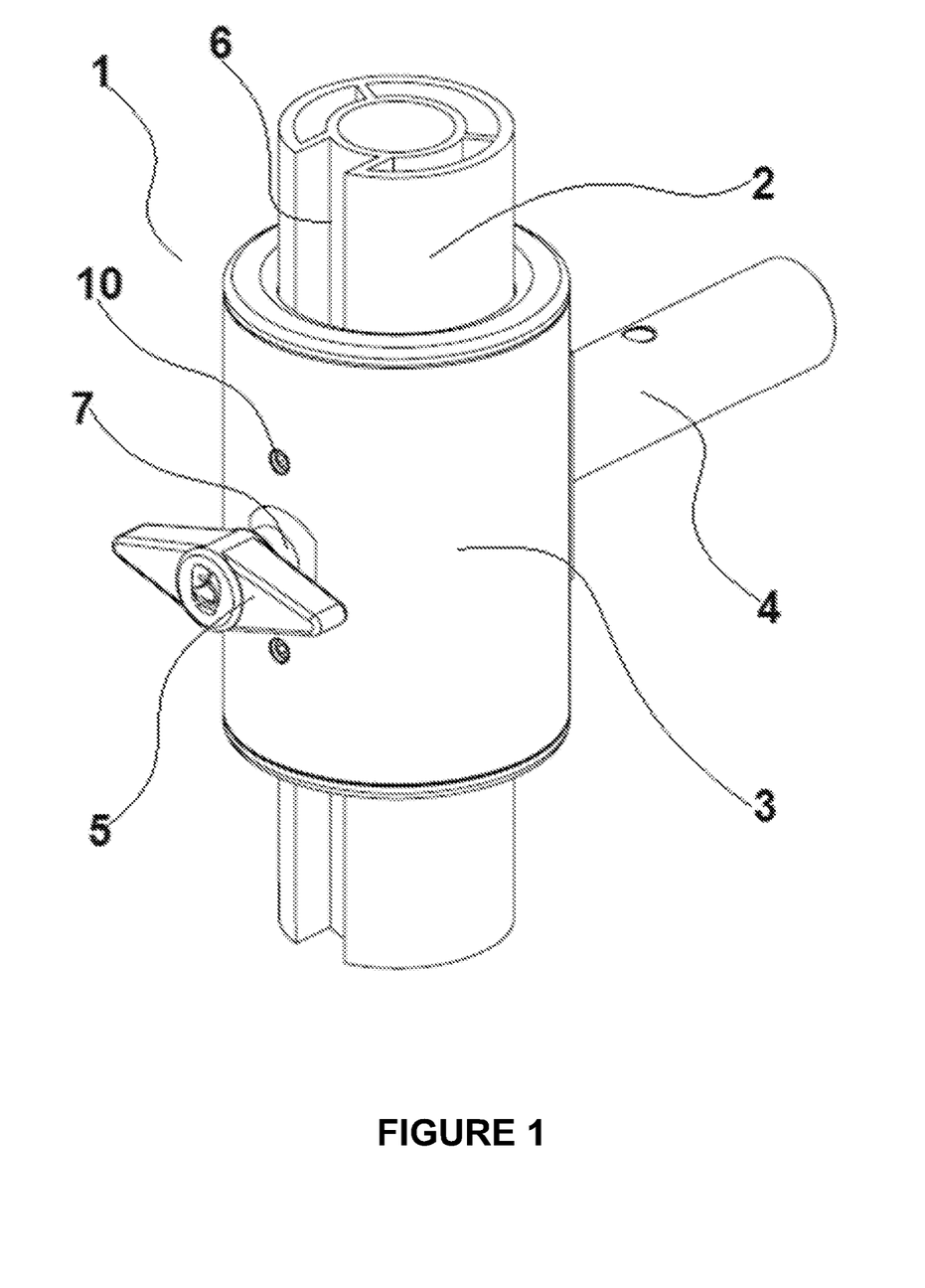
FIG. 1 is a perspective view of an adjustment mechanism according to the present invention.

The adjustment mechanism according to the present invention is basically devised such that a member aimed to be moved on a support bar is made rigid, or it is made freely displaceable on the support bar, to make a change in a relative distance or height of a component in a Pilates exercise equipment. In order to provide an easy understanding of the present invention, a device will be disclosed here, which is devised to cover a demand in Pilates exercise equipment. The adjustment mechanism to be disclosed here, however, is applicable to any kind of exercise devices or physiotherapy devices or to similar devices. Accordingly, the basic embodiment shown in FIG. 1 will be disclosed by referring to a Pilates device representatively illustrated in FIG. 7, and this disclosure is supported by other figures herein.

Figure 2:
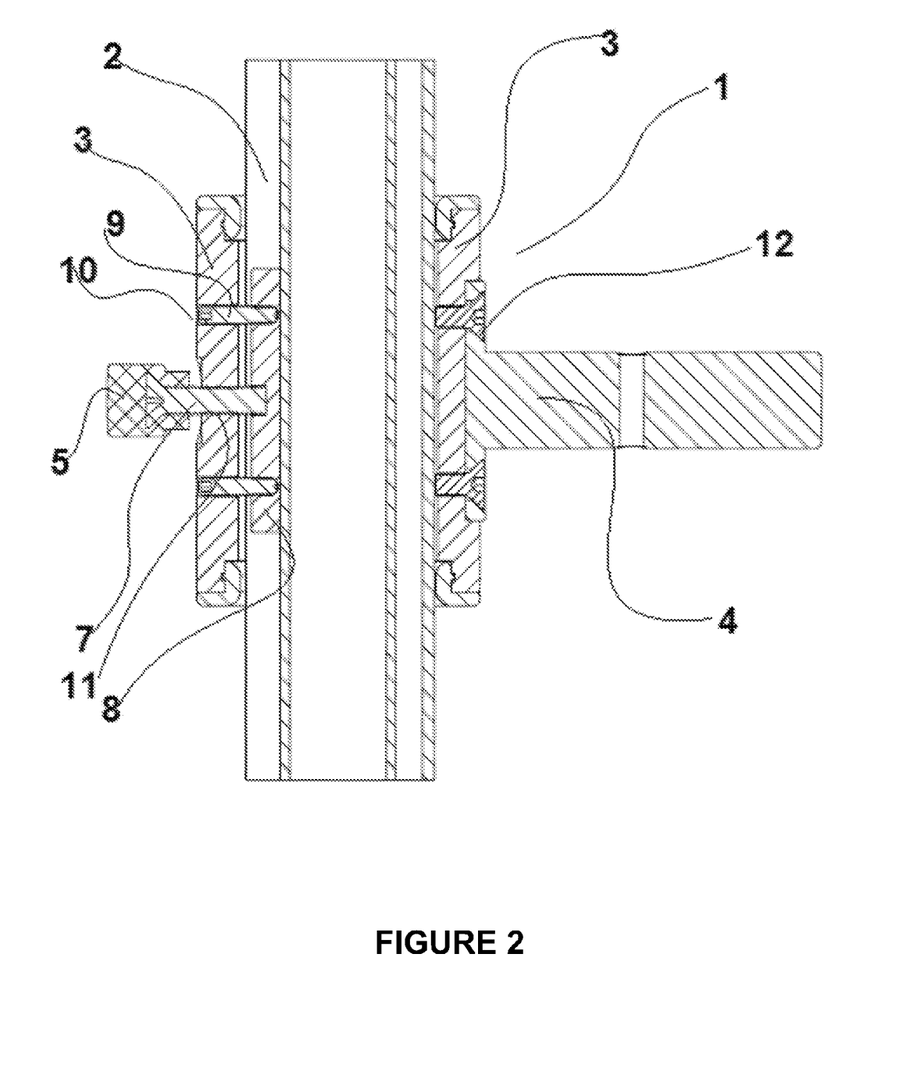
FIG. 2 is a side cross-sectional view of the adjustment mechanism according to the present invention.
Figure 3:
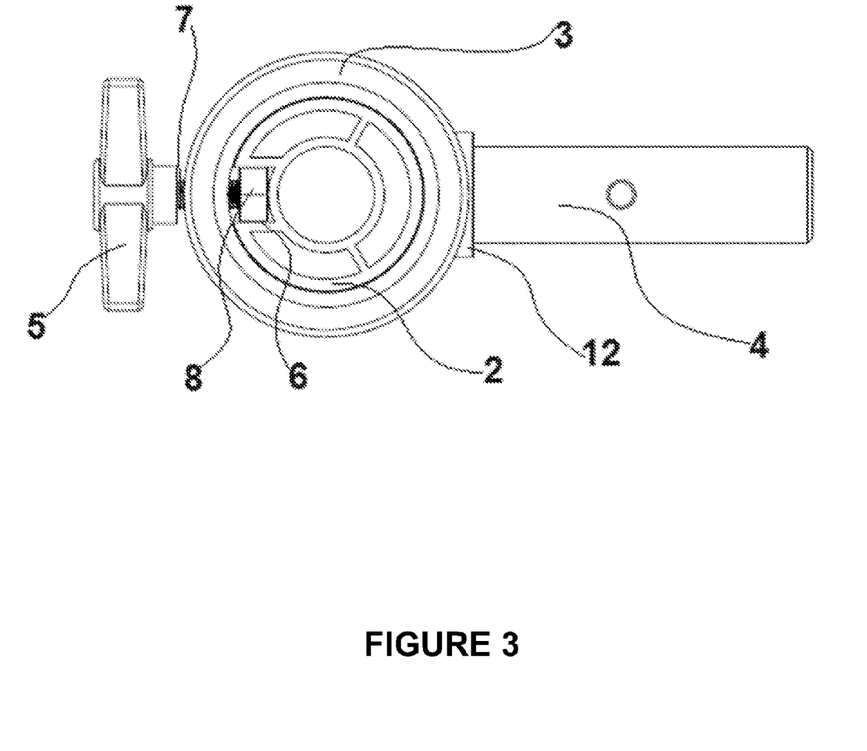
FIG. 3 is a plan view of the adjustment mechanism according to the present invention.
Figure 4:
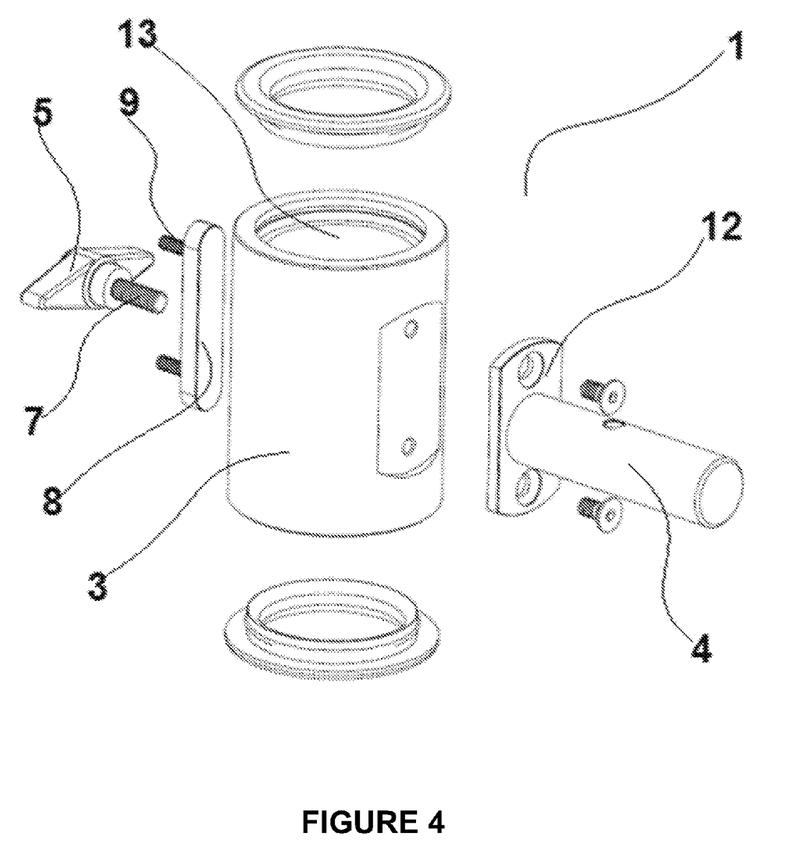
FIG. 4 is a perspective view of the adjustment mechanism according to the present invention in a disassembled form.
Figure 5:
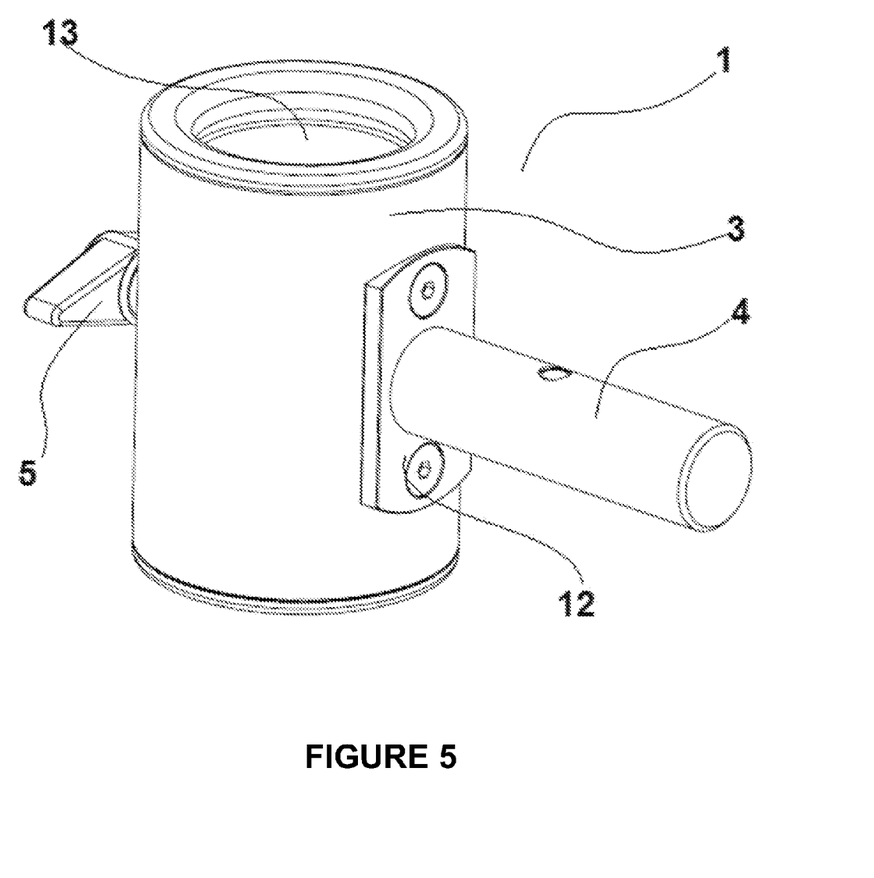
FIG. 5 is a perspective view of the adjustment mechanism according to the present invention from another point of view.
Figure 6:
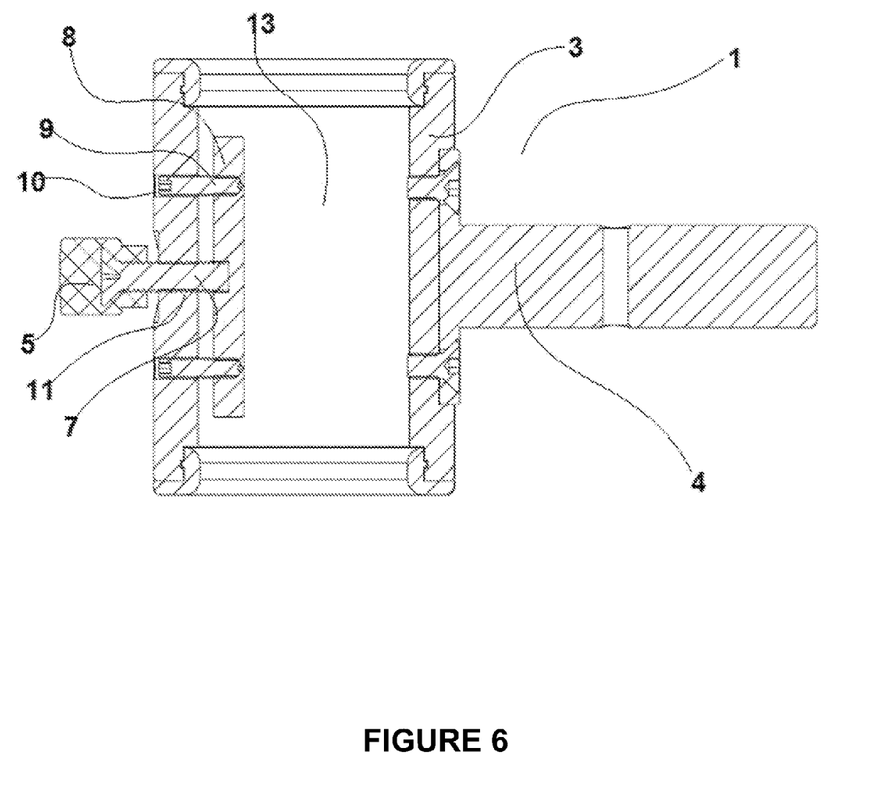
FIG. 6 is a side cross-sectional view of an advanced tightening element within the adjustment mechanism according to the present invention.
Figure 7:
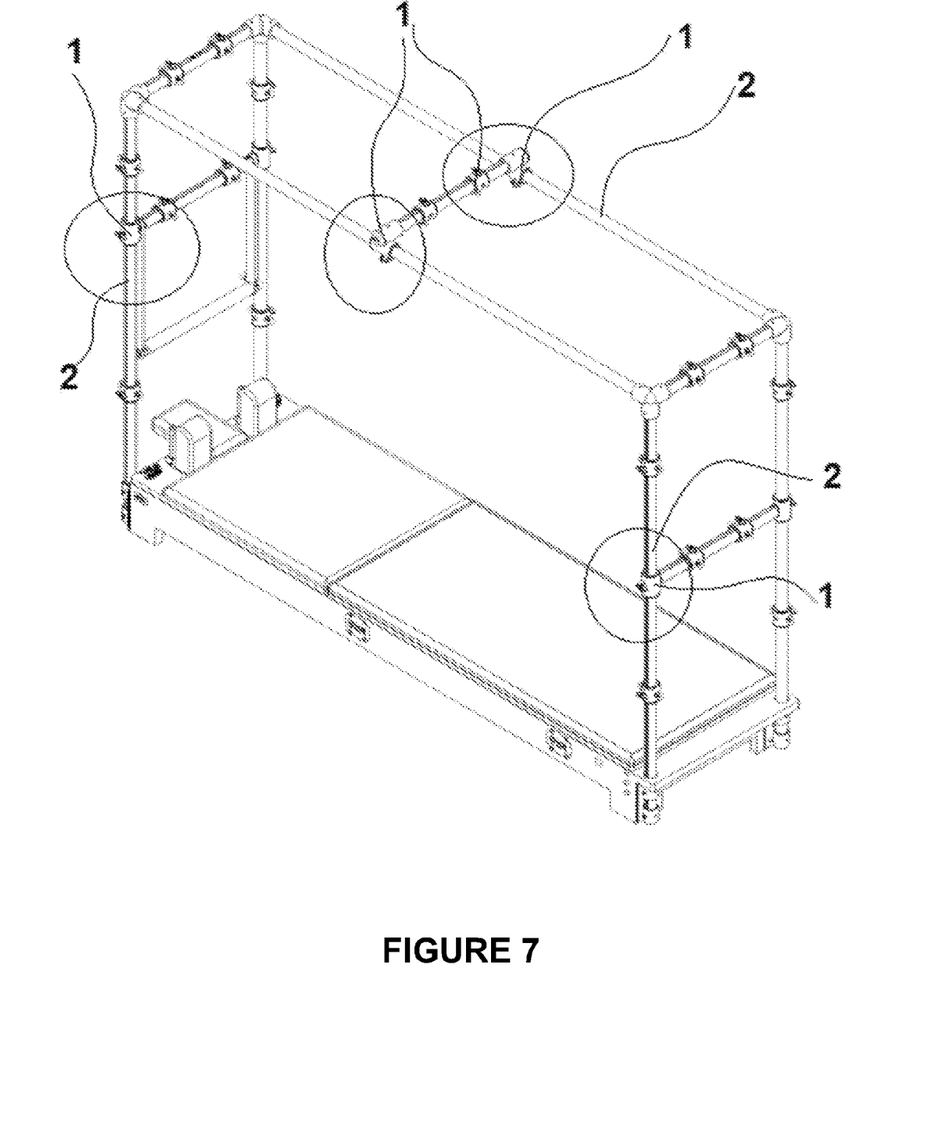
FIG. 7 is a representative view of a Pilates exercise device in which the adjustment mechanism according to the present invention is used.

The height- and distance-adjustment device according to the present invention is to be used to change a height, a distance or any other length in an exercise device which a user operates using the hands or the feet. Thus, the relative position of a handle, pedal, rope, bar, etc. coupled to the device according to the present invention will be changed. As different from what is known in the prior art, it is aimed both to make this device comfortable in terms of its user and to provide a device form, which would not deteriorate the appearance of the exercise device on which it is to be used. Thus, an adjustment mechanism 1 according to the present invention illustrated in FIG. 1, FIG. 4, and FIG. 5 comprises a hollow body interior 13, wherein a support bar 2 is passed through the hollow body interior 13. As illustrated in FIG. 7, the support bars 2 may be configured in the form of a framework to which some exercise equipment placed on the top or sides of a Pilates device can be coupled. The support bar 2 can preferably have a tubular cross-section, or it may have a rectangular, elliptical, triangular or any other cross-section. As illustrated in FIG. 2, FIG. 3, and FIG. 6, the support bar 2 is passed through the hollow body interior 13 of the adjustment mechanism 1 and the number of adjustment mechanisms to be mounted is so selected that it would allow to make the required up-down, back-forth, or any other devisable displacements on the support bars 2. The support bar 2 is passed through the adjustment mechanism 1 so as to result in a clearance fit. The clearance fit is made rigid as a result of a tightening effect as described below.

The adjustment mechanism 1 according to the present invention is composed of a body 3, a hollow body interior 13 formed in the body 3, at least one screw hole 11 formed on one side of the body 3, at least one tightening screw 7 passed through said screw hole 11, a knob 5 rigidly connected to said tightening screw 7 to turn the screw 7, at least one tightening member 8 on which the tip portion of said tightening screw 7 rests in the interior, at least one guide 9 rigidly connected to said tightening member 8, and at least one guide hole 10 formed on said body 3 supporting said guide 9 in a free fit. The body 3 can be made preferably from aluminum, iron-based metals, plastic or composite materials. A hollow body interior 13 is formed in the body 3 with a cross-section in line with the cross-section of the support bar 2 so that the support bar 2 can be freely passed through the hollow body interior 13. Here, preferably a tubular hollow body interior 13 is formed. On one side of the body 3 is provided a coupling 12 to which a joining post 4 is coupled. The joining post 4 can be a bar, a post, or a plate according to the exercise device to be used, but the joining post 4 can also be optionally omitted when the adjustment mechanism 1 is used. A threaded screw hole 11 is formed on one side of the body 3 so that the tightening screw 7 can be screwed therein. Preferably one screw hole 11 is provided in one adjustment mechanism 1, but the amount of the screw hole 11 can be increased when required. The shape of the tightening screw 7 is in compliance with that of the screw hole 11. As the tightening screw 7 is turned it is advanced into the interior of the body 3 so that it tightens the support bar 2 within the body. However, this tightening effect is not ensured with the tightening screw 7 directly pressing onto the support bar 2 as it is known from the prior art, but it is devised so that an intermediary tightening member 8 compresses the support bar. The tightening screw 7 is provided with a knob on the outside, which can be easily and conveniently griped by a human hand. The knob 5 is preferably a winged knob, but other forms can also be devised. The tightening member 8 receives a compressive force from the tightening screw 7 as the tightening screw 7 is advanced in its hole and thus compresses the support bar 2 in the body 3 to make it 2 rigid there from a freely displaceable state within the body 3. The tightening member is disposed in a groove 6 provided in the support bar 2. The groove 6 is a lengthwise cavity formed all along in the support bar 2. The tightening member 8 should have a width and depth that would make the tightening member 8 easy displaceable within the groove 6. Under normal conditions, the tightening member 8 will be freely displaceable within the groove 6 and when the tightening screw 7 is advanced towards the support bar 2, it will restrict the free movement of the support bar 2 and make it rigid at a position where the user makes the adjustment. However, in order to be able to move the tightening member together with the body 3, at least one, preferably two guides 9 are rigidly coupled to the tightening member 8. These guides 9 can be connected to the tightening member 8 by screwing, tightening, or by any other means. One end of each of the guides 9 can freely move in guide holes 10 provided in the sides of the body 3. The guide holes 10 only enable the guides 9 and thus the tightening member 8 to be moved towards or back from the support bar 2. It restricts their movement in any other directions. The tightening member 8 may be made of metal, plastic, a composite material or rubber. When the whole member, or the part of the member resting against the support bar 2 is made of a flexible material such as rubber, the tightening effect can be generated in a nondestructive and safe manner. Therefore this material is preferably a flexible material.

The adjustment mechanism 1 according to the present invention can be used in a combined manner composed of several such mechanisms, or can be used singly with a support bar 2. When it is used together with the joining post 4, it is fastened to the body 4 by means of a coupling 12. This coupling 12 can be a screw connection, a tight fit, a pin connection, or a weld connection.

The adjustment mechanism 1 according to the present invention is preferably designed for use with Pilates exercise devices. However, it can also be used in other sports-oriented and physiotherapy exercise equipment wherein adjustments are made on support bars. Therefore, this invention should not be construed to be restricted to Pilates exercise equipment only.

What is claimed is:

1. An adjustment mechanism for use in exercise devices, comprising:
   a body,
   a hollow body interior formed in the body,
   at least one screw hole formed on a first side of the body,
   at least one tightening screw passing through the at least one screw hole,
   a knob rigidly connected to the at least one tightening screw to turn the at least one tightening screw, at least one tightening member on which a tip portion of the at least one tightening screw rests in the hollow body interior,
at least one guide rigidly connected to the at least one tightening member, and
at least one guide hole formed on the body to support the at least one guide in a free fit, wherein
the adjustment mechanism further comprises a support bar in the body, at least one groove in the support bar, and the support bar being freely passable through the hollow body interior in the body,
the at least one tightening member is disposed in the at least one groove in the support bar in the body,
the at least one guide hole has a clearance so as to allow the at least one guide to be displaced freely on the body, and
the adjustment mechanism further comprises a coupling on a second side of the body opposite the first side, and a joining post positioned outside of the hollow body interior and connected to the coupling, wherein the joining post is located on the second side of the body and is opposite the at least one tightening member.

2. The adjustment mechanism according to claim 1, wherein the knob is disposed on an external side of the at least one tightening screw to turn the at least one tightening screw.

3. The adjustment mechanism according to claim 1, wherein at least a part of the at least one tightening member resting against the support bar is made of a flexible material.

\* \* \* \* \*